(12) United States Patent
Gerrese et al.

(10) Patent No.: US 11,807,278 B2
(45) Date of Patent: Nov. 7, 2023

(54) AUTONOMOUS VEHICLE PASSENGER SAFETY MONITORING

(71) Applicant: GM Cruise Holdings LLC, San Francisco, CA (US)

(72) Inventors: Alexander Willem Gerrese, San Francisco, CA (US); Jeremy Stephen Juel, San Francisco, CA (US); Yifei Zhang, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 177 days.

(21) Appl. No.: 17/076,372

(22) Filed: Oct. 21, 2020

(65) Prior Publication Data
US 2022/0119005 A1 Apr. 21, 2022

(51) Int. Cl.
*B60W 60/00* (2020.01)
*B60Q 1/52* (2006.01)
(Continued)

(52) U.S. Cl.
CPC ............ *B60W 60/007* (2020.02); *B60Q 1/52* (2013.01); *B60Q 5/005* (2013.01); *B60W 60/0016* (2020.02); *G05D 1/0055* (2013.01); *G05D 1/0276* (2013.01); *B60W 2540/00* (2013.01); *B60W 2756/10* (2020.02)

(58) Field of Classification Search
CPC ......... G05D 2201/0213; G05D 1/0088; G05D 2201/0212; G05D 1/0055; G05D 1/0077; G05D 1/0238; G05D 1/0257; G05D 1/0276; G05D 1/0231; G05D 1/0278; B60W 2556/45; B60W 60/007; B60W 2556/60; B60W 60/0015; B60W 2050/143; B60W 2420/42; B60W 2540/00; B60W 2556/55; B60W 60/0051; B60W 50/0098; B60W 60/00253; B60W 50/045; B60W 2756/10; B60W 60/0016; B60W 60/00259; G01C 21/3407; B60Q 1/52; B60Q 1/46; B60Q 1/0035; B60Q 1/507; B60Q 5/005;
(Continued)

(56) References Cited

U.S. PATENT DOCUMENTS 10,549,690 B1 * 2/2020 Englander .............. B60Q 9/008
2014/0258405 A1 9/2014 Perkin
(Continued)

FOREIGN PATENT DOCUMENTS

DE 102017101494 A1 * 7/2017 ............. G06Q 10/02
WO WO-2019165451 A1 * 8/2019 ........... G05B 13/027

OTHER PUBLICATIONS

Translation of DE102017101494A1 (Year: 2017).*

*Primary Examiner* — Kenneth J Malkowski
*Assistant Examiner* — Carville Albert Hollingsworth, IV
(74) *Attorney, Agent, or Firm* — Akona IP

(57) ABSTRACT

Systems and methods are provided for autonomous vehicle passenger safety monitoring following an autonomous vehicle route. In particular, an autonomous vehicle waits for a selected time period after a passenger exits the vehicle. In some examples, the autonomous vehicle remains until the passenger has entered a building at the passenger's destination. In some examples, the autonomous vehicle remains until the passenger is no longer detectable by the vehicle's sensors. During the waiting period, the passenger may choose to re-enter the vehicle.

20 Claims, 7 Drawing Sheets

(51) Int. Cl.
*B60Q 5/00* (2006.01)
*G05D 1/02* (2020.01)
*G05D 1/00* (2006.01)

(58) Field of Classification Search
CPC ........ G07C 5/008; G06F 9/4881; H04W 4/44;
B60K 28/06; G06V 20/58
See application file for complete search history.

(56) References Cited

U.S. PATENT DOCUMENTS

| | | |
|---|---|---|
| 2016/0050356 A1 | 2/2016 | Nalepka et al. |
| 2016/0071418 A1* | 3/2016 | Oshida ................ G05D 1/0295 701/23 |
| 2017/0123423 A1* | 5/2017 | Sako ........................ G08G 1/00 |
| 2018/0211541 A1* | 7/2018 | Rakah .................... G08G 1/148 |
| 2018/0275661 A1* | 9/2018 | Glaser ................ G01C 21/3423 |
| 2018/0357824 A1 | 12/2018 | Wu et al. |
| 2019/0137290 A1* | 5/2019 | Levy ........................ B60Q 1/50 |
| 2020/0071967 A1* | 3/2020 | Adams .................. G08B 21/24 |
| 2020/0098201 A1* | 3/2020 | Reibling .............. B60W 30/09 |
| 2020/0213560 A1 | 7/2020 | Zhang et al. |
| 2021/0181736 A1* | 6/2021 | Reda ........................ G06F 9/541 |
| 2021/0192864 A1 | 6/2021 | McKnew et al. |
| 2021/0394793 A1 | 12/2021 | Austin et al. |
| 2022/0063689 A1 | 3/2022 | Kumar et al. |
| 2022/0194409 A1 | 6/2022 | Koga |
| 2022/0327651 A1 | 10/2022 | Trim et al. |

* cited by examiner

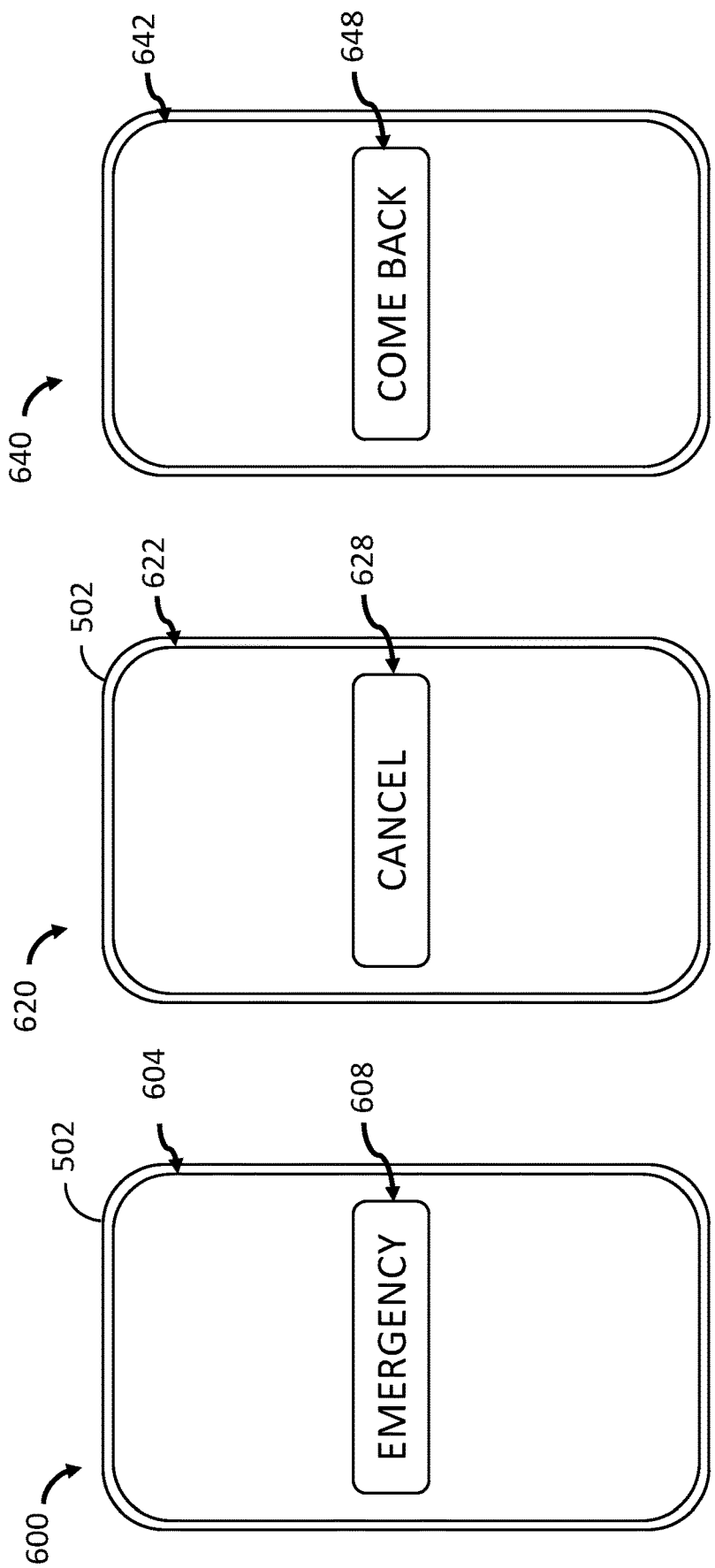

AUTONOMOUS VEHICLE PASSENGER SAFETY MONITORING

FIELD OF THE DISCLOSURE

The present disclosure relates generally to autonomous vehicles (AVs) and to systems and methods for passenger safety.

BACKGROUND

Autonomous vehicles, also known as self-driving cars, driverless vehicles, and robotic vehicles, are vehicles that use multiple sensors to sense the environment and move without human input. Automation technology in the autonomous vehicles enables the vehicles to drive on roadways and to accurately and quickly perceive the vehicle's environment, including obstacles, signs, and traffic lights. The vehicles can be used to pick up passengers and drive the passengers to selected destinations. The vehicles can also be used to pick up packages and/or other goods and deliver the packages and/or goods to selected destinations.

Autonomous vehicles are often used to provide rides to passengers who remotely request a vehicle for a selected pick up location and destination. Some passenger trip requests include destinations with high crime rates or places the passenger has not visited before. Some passenger trip requests occur late at night. In some instances, a passenger may not feel safe exiting the vehicle.

SUMMARY

Systems and methods are provided for autonomous vehicle passenger safety monitoring following an autonomous vehicle route. In particular, an autonomous vehicle waits for a selected time period after a passenger exits the vehicle. In some examples, the autonomous vehicle remains until the passenger has entered a building at the passenger's destination. In some examples, the autonomous vehicle remains until the passenger is no longer detectable by the vehicle's sensors. During the waiting period, the passenger may choose to re-enter the vehicle.

According to one aspect, a method for passenger safety monitoring in an autonomous vehicle includes dropping off a passenger at a destination location; waiting at the destination location for a selected period of time, when a wait option is selected; monitoring the passenger during the selected period of time; and monitoring vehicle surroundings during the selected period of time.

According to another aspect, an autonomous vehicle configured for passenger safety monitoring includes an onboard computing system configured to stop the autonomous vehicle at a destination location, receive a wait request including a selected wait period, and keep the vehicle near the destination location during the selected wait period; and a plurality of sensors configured to monitor a passenger during the selected wait period.

According to another aspect, a system for passenger safety monitoring in an autonomous vehicle includes: a central computing system including a routing coordinator configured to: receive a wait request including a destination location, determining identification of the autonomous vehicle associated with the wait request, and adding a selected wait time to the autonomous vehicle route; and an onboard computing system on the first autonomous vehicle configured to: receive the wait request, drop off the passenger at the destination location, and wait at the destination location for the selected wait time.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

To provide a more complete understanding of the present disclosure and features and advantages thereof, reference is made to the following description, taken in conjunction with the accompanying figures, wherein like reference numerals represent like parts, in which:

FIGS. 6A-6C show examples of an interface for requesting an autonomous vehicle emergency assistance, according to some embodiments of the disclosure.

DETAILED DESCRIPTION

Overview

Figure 1:
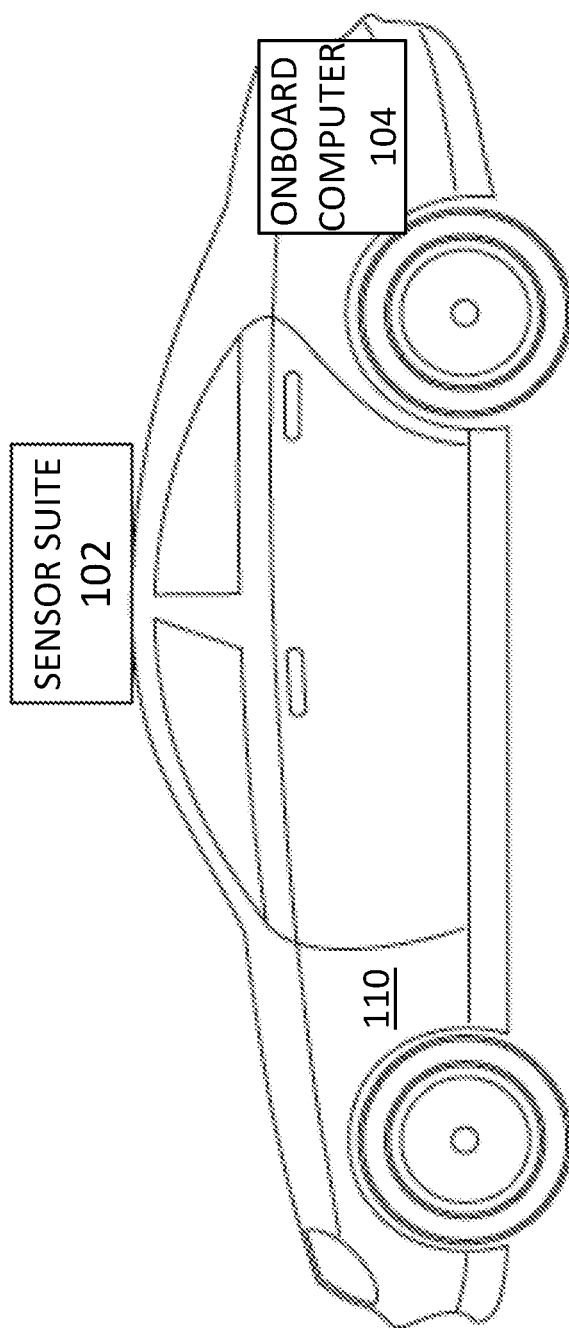
FIG. 1 is a diagram illustrating an autonomous vehicle, according to some embodiments of the disclosure.

Systems and methods are provided for autonomous vehicle passenger safety monitoring following an autonomous vehicle route. Safety features are disclosed that enable users to delay departure until the passenger feels secure (e.g., until the passenger makes it inside their home/destination), using the car's sensors and connectivity to monitor the environment and alert contacts and/or law enforcement if an emergency occurs. In particular, an autonomous vehicle waits for a selected time period after a passenger exits the vehicle. In some examples, the autonomous vehicle remains until the passenger has entered a building at the passenger's destination. In some examples, the autonomous vehicle remains until the passenger is no longer detectable by the vehicle's sensors. During the waiting period, the passenger may choose to re-enter the vehicle. If an emergency is reported or detected while the autonomous vehicle is waiting, the autonomous vehicle can assist in sounding an alarm and in contacting emergency services.

Systems and methods are provided for safety features that allow a user to request a delayed departure of the autonomous vehicle, such that the vehicle remains near the passenger until the passenger has successfully entered their final destination. Since autonomous vehicles are equipped with cameras and sensors in many locations around the car, an autonomous vehicle can monitor the surrounding environment while tracking the user. In some examples, bright lights can serve as first line deterrents to potential attackers, and loud sounds and honking can be used as secondary deterrents if the user feels unsafe. If the passenger is unable to enter the destination or feels unsafe, the autonomous vehicle is still present and available to continue the ride to a new destination.

Safety is a top concern of rideshare users, and can be divided into several different categories. First, safety related driving performance, in particular, avoiding car crashes. Second, safety related to driver behavior, such as inappropriate or dangerous acts of the driver. And third, safety during passenger pick-up and drop-off, including avoidance of unsafe encounters outside the vehicle. In general, since autonomous vehicles are driverless, passengers do not need to be concerned about driver performance or driver behavior. However, passenger safety during pick-up and drop-off can still be a concern. In particular, a passenger may be especially concerned about safety during pick-up and drop-off in certain neighborhoods and at certain times of day. For example, a passenger may not feel safe in a poorly lit neighborhood with high crime rates at night. In many instances, passengers feel unsafe walking between the drop-off point and the final destination.

Rideshare drivers typically depart immediately after dropping off a passenger. In general, rideshare drivers leave because they have already been routed to the next passenger, or simply because there is no incentive to stay in one spot for more time than is necessary.

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure are set forth in the proceeding in view of the drawings where applicable.

Example Autonomous Vehicle Configured for Safety Monitoring

FIG. 1 is a diagram 100 illustrating an autonomous vehicle 110, according to some embodiments of the disclosure. The autonomous vehicle 110 includes a sensor suite 102 and an onboard computer 104. In various implementations, the autonomous vehicle 110 uses sensor information from the sensor suite 102 to determine its location, to navigate traffic, to sense and avoid obstacles, and to sense its surroundings. According to various implementations, the autonomous vehicle 110 is part of a fleet of vehicles for picking up passengers and/or packages and driving to selected destinations. The autonomous vehicle 110 is configured for passenger safety monitoring.

The sensor suite 102 includes localization and driving sensors. For example, the sensor suite may include one or more of photodetectors, cameras, RADAR, SONAR, LIDAR, GPS, inertial measurement units (IMUs), accelerometers, microphones, strain gauges, pressure monitors, barometers, thermometers, altimeters, wheel speed sensors, and a computer vision system. The sensor suite 102 continuously monitors the autonomous vehicle's environment and, in some examples, sensor suite 102 data is used to detect selected events, including events related to passenger safety. In particular, data from the sensor suite can be used to update a map with information used to develop layers with waypoints identifying selected events, the locations of the encountered events, and the frequency with which the events are encountered at the identified location. In some examples, the events include passenger-safety related and/or emergency related events. In some examples, the occurrence of an emergency event is reported and this information is recorded in a mapping system, which can identify high-risk areas. In this way, sensor suite 102 data from many autonomous vehicles can continually provide feedback to the mapping system and the high fidelity map can be updated as more and more information is gathered.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point-cloud of the region intended to scan. In still further examples, the sensor suite 102 includes RADARs implemented using scanning RADARs with dynamically configurable field of view.

The autonomous vehicle 110 includes an onboard computer 104, which functions to control the autonomous vehicle 110. The onboard computer 104 processes sensed data from the sensor suite 102 and/or other sensors, in order to determine a state of the autonomous vehicle 110. In some implementations described herein, the autonomous vehicle 110 includes sensors inside the vehicle. In some examples, the autonomous vehicle 110 includes one or more cameras inside the vehicle. The cameras can be used to detect items or people inside the vehicle. In some examples, the autonomous vehicle 110 includes one or more weight sensors inside the vehicle, which can be used to detect items or people inside the vehicle. In some examples, the interior sensors can be used to detect passengers inside the vehicle. Based upon the vehicle state and programmed instructions, the onboard computer 104 controls and/or modifies driving behavior of the autonomous vehicle 110.

The onboard computer 104 functions to control the operations and functionality of the autonomous vehicle 110 and processes sensed data from the sensor suite 102 and/or other sensors in order to determine states of the autonomous vehicle. In some implementations, the onboard computer 104 is a general-purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

According to various implementations, the autonomous driving system 100 of FIG. 1 functions to enable an autonomous vehicle 110 to modify and/or set a driving behavior in response to parameters set by vehicle passengers (e.g., via a passenger interface) and/or other interested parties (e.g., via a vehicle coordinator or a remote expert interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences. In some examples, a passenger requests that the autonomous vehicle 110 wait after the passenger exits the vehicle at the drop-off location, and monitor the passenger and the vehicle surroundings until the passenger has reached an ultimate destination, such as the inside of a building.

The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, or a scooter. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

Example Method for Passenger Safety Monitoring

Figure 2:
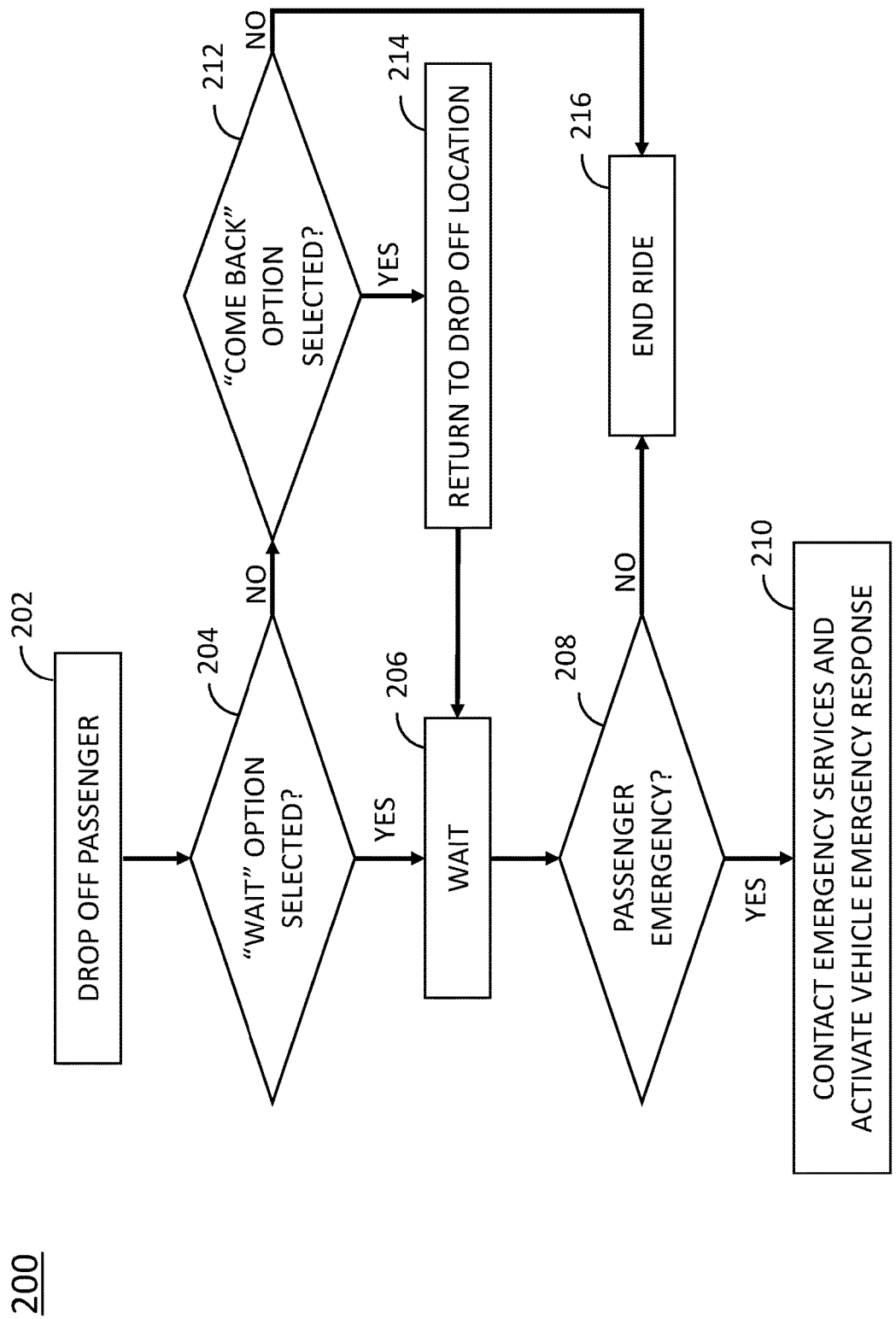
FIG. 2 is a diagram illustrating a method for a passenger safety option for an autonomous vehicle, according to some embodiments of the disclosure.

FIG. 2 is a diagram illustrating a method for a passenger safety option for an autonomous vehicle, according to some embodiments of the disclosure. At step 202, an autonomous vehicle arrives at a destination and the passenger exits the vehicle. At step 204, the autonomous vehicle determines whether a request for the vehicle to wait has been received. In particular, the passenger is presented with the option to request that the vehicle wait after the passenger exits the vehicle. This may include a request that the vehicle wait until the passenger has entered a building at the destination and/or it may include a request that the vehicle wait until the passenger is no longer visible. In some examples, the request includes a specific amount of time that the vehicle is to wait, such as about one minute, about two minutes, or about three minutes.

If the autonomous vehicle determines at step 204 that a wait request has been received, at step 206, the autonomous vehicle waits for the selected period of time. If the autonomous vehicle determines at step 204 that a wait request has not been received, the method proceeds to step 212. The autonomous vehicle drives away from the drop off location after the passenger exits the vehicle, but the passenger is presented with a "come back" option in the rideshare interface. The "come back" option may be present for a selected period of time following drop off, and the user may be given the option of closing it out. At step 212, if a "come back" request is received, the autonomous vehicle returns to the drop-off location (step 214). The method returns to step 206 and the autonomous vehicle waits for the selected period of time. At step 212, if no "come back" request is received, the method proceeds to step 216, and the ride is ended.

During the wait period, at step 206, the autonomous vehicle sensors monitor the surrounding of the autonomous vehicle. The autonomous vehicle sensors also track the passenger and monitor for any emergency events. In some examples, vehicle sensors detect a scream, a shout, a call for help, the passenger falling to the ground, and the passenger being approached by a person. At step 208, if an emergency is detected, the method proceeds to step 210, emergency services are contacted and a vehicle emergency response is activated. Contacting emergency services can include calling a local police department and/or calling 911 and providing location information. In some examples, a vehicle emergency response includes flashing lights and/or sounding an alarm. In some examples, detection of an emergency is based on input from the passenger. In particular, during the wait period, the passenger's phone displays an emergency alert button, and if the passenger presses the button, emergency services are called. At step 208, if an emergency is not detected during the wait time, the ride ends at step 216. In some examples, the passenger selects a "complete trip" button to indicate safe arrival and end the ride including ending the waiting period.

In some implementations, systems and method described herein can be used for deliveries using an autonomous vehicle. In particular, autonomous vehicles can monitor the person who drops off or picks up a delivery.

Example Method for Autonomous Vehicle Passenger Safety Protocols

Figure 3:
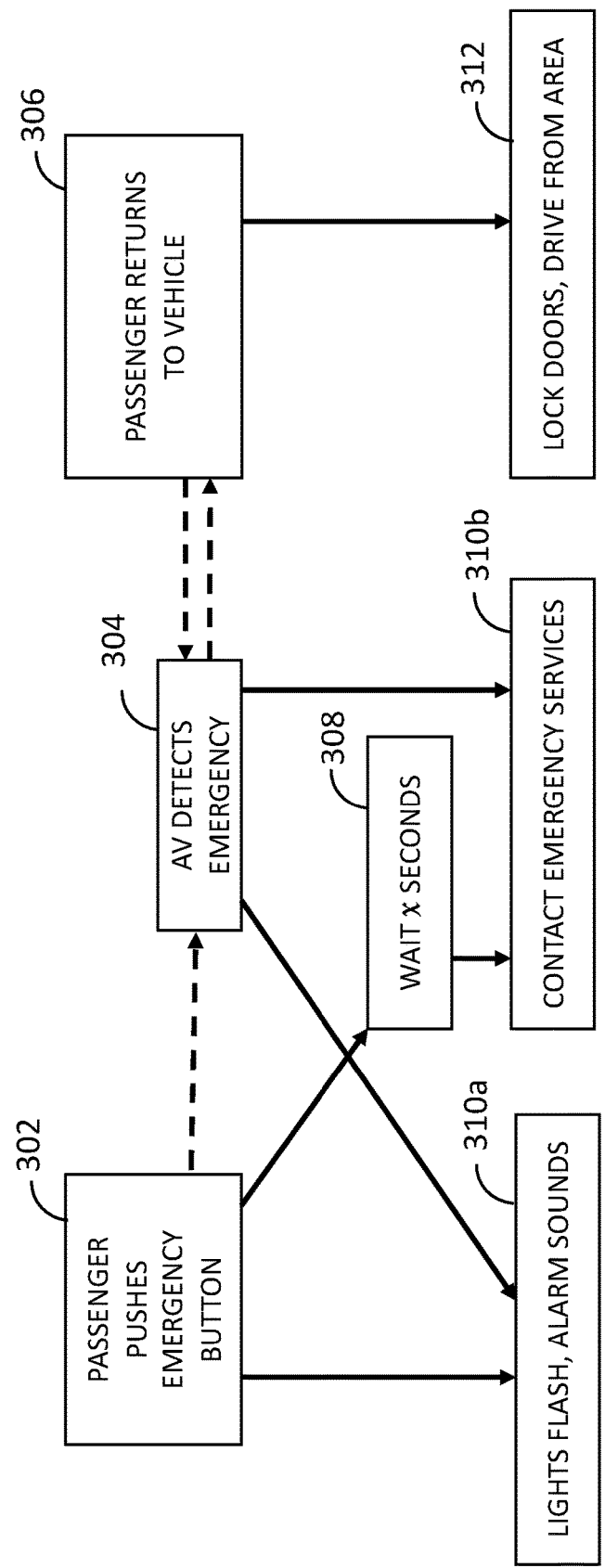
FIG. 3 is a diagram illustrating a method for autonomous vehicle passenger safety protocols, according to some embodiments of the disclosure.

FIG. 3 is a diagram illustrating a method 300 for autonomous vehicle passenger safety protocols, according to some embodiments of the disclosure. The method 300 in FIG. 3 begins when an autonomous vehicle is waiting after a passenger drop-off, as described above with respect to FIG. 2. In particular, the method 300 is triggered by an emergency event, e.g., at step 208 in the method 200. In some implementations, the method 300 starts at step 302, when the passenger selects the emergency button. In particular, at step 302, the emergency alert from the passenger's device (e.g., the passenger's phone) is received by a central service, and by the autonomous vehicle. In some examples, when the emergency alert is received at the autonomous vehicle, the method proceeds to step 310a, and an autonomous vehicle alarm is activated. The autonomous vehicle alarm includes one or more of a siren, a horn, and flashing vehicle lights. Flashing vehicle lights can include headlights, tail lights, and also any other lights positioned on the vehicle. In some examples, there is a short waiting period (e.g., step 308) before the alarm is sounded, allowing the passenger time to cancel the emergency alert (e.g., in case it was selected accidentally).

Additionally, when the emergency alert is received at the autonomous vehicle, the method proceeds to step 308, and waits for a few seconds in case the passenger selected the emergency button accidentally and subsequently cancels the request. If a cancellation request is received within the selected wait period, the method ends at step 308. If no cancellation request is received within a certain period of time at step 308, the method proceeds to step 310b, and emergency services are contacted, such as police.

In some implementations, the wait period occurs on the passenger's phone, before the emergency request is submitted to a central service. In one example, after the passenger selects the emergency button, the passenger is given the option to cancel the emergency request and the option to confirm the emergency request. If the user confirms the emergency request, the method proceeds directly to steps 310a and 310b. If the passenger takes no action, the passenger's device waits for a selected period of time (step 308) before sending the request to the central service. Once the request is sent, the method proceeds directly to steps 310a (car alarm sounds and lights flash) and 310b (emergency services contacted).

In some implementations, the method 300 starts at step 304, when the autonomous vehicle detects an emergency. In particular, at step 304, autonomous vehicle sensors detect an emergency situation. In one example, one or more microphones detect a scream, a yell, and/or a cry for help. In another example, video sensors detect the passenger falling to the ground. In some examples, the sensors detect an assault or attack on the passenger. When the autonomous vehicle detects an emergency at step 304, the method 300 proceeds directly to step 310a (car alarm sounds and lights flash) and to step 310b (contacting emergency services).

In other implementations, the method 300 starts at step 306, when the passenger returns to the waiting vehicle. If the passenger returns to the autonomous vehicle during the wait period, at step 312, the autonomous vehicle locks the doors to prevent another person from entering the vehicle. In some examples, autonomous vehicle sensors determine whether any additional person has entered the vehicle other than the passenger(s) who were just dropped off. When the passenger returns to the vehicle at step 306, the autonomous vehicle also proceeds to step 304 and determines if there is an emergency. In some examples, the passenger returns to the vehicle at step 306 at the same time as, or after, the autonomous vehicle determines that there is an emergency. Thus, the autonomous vehicle also contacts emergency services (step 310b) and sounds an alarm (step 310a). In some examples, the passenger returns to the vehicle at step 306 in conjunction with selecting the emergency button at step 302. Thus, the autonomous vehicle also contacts emergency services (step 310b) and sounds an alarm (310a).

In some implementations, after a passenger re-enters the vehicle, a passcode is required to verify passenger identity. In some examples, multiple failed attempts will trigger an in-car emergency response by an operator. In some examples, a special code can be used to signal an emergency and trigger an in-car emergency response. If the vehicle detects a change in the number of passengers, the vehicle triggers an in-car emergency response. In various examples, vehicle video footage can be used as evidence and/or shared with law enforcement.

In some implementations, a vehicle may be unable to determine whether a particular event is an emergency or not. An in-car support response can be engaged to determine whether an event is an emergency. In some examples, an in-car support response is a response by a person who evaluates the vehicle data to determine whether there is an emergency. In some examples, an in-car support response is an automated response system that asks for certain passenger responses. The in-car suppose response can be engaged whether the passenger is inside or outside the vehicle.

In some implementations, an autonomous vehicle drives away from the drop off location after the passenger returns to the vehicle in step 306. In some examples, at step 306, no emergency is detected or reported, and the passenger selects a new destination after returning to the vehicle. In some examples, after the passenger has returned to the vehicle, the vehicle drives from the drop-off location to avoid potential danger. In some examples, when no new destination is selected, the vehicle drives towards the closest emergency services location (e.g., police station or fire station). In other examples, when no new destination is selected, the vehicle drives back towards the pick-up location.

Example of Autonomous Vehicle Fleet

Figure 4:
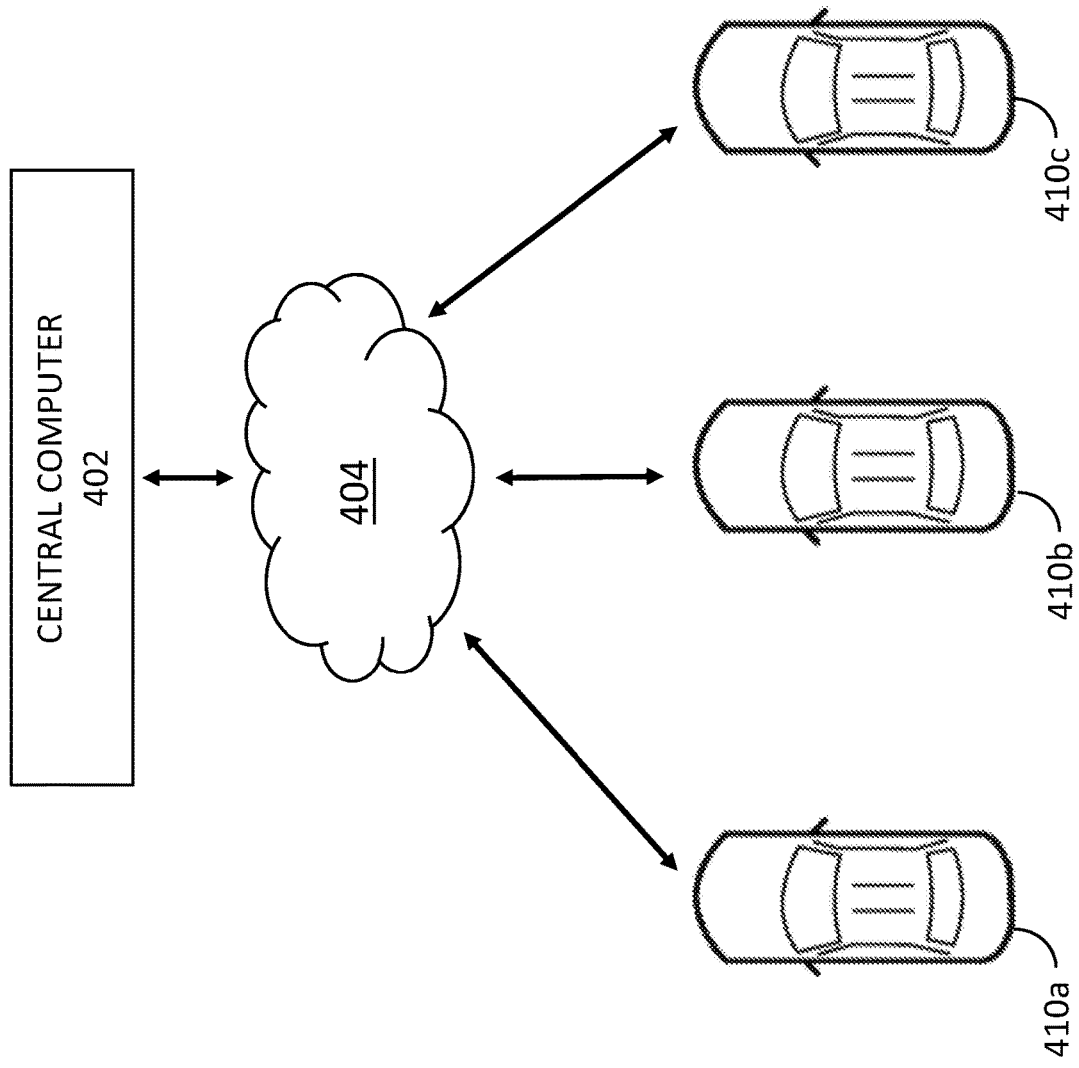
FIG. 4 is a diagram illustrating a fleet of autonomous vehicles in communication with a central computer, according to some embodiments of the disclosure.

FIG. 4 is a diagram 400 illustrating a fleet of autonomous vehicles 410a, 410b, 410c in communication with a central computer 402, according to some embodiments of the disclosure. As shown in FIG. 4, the vehicles 410a-410c communicate wirelessly with a cloud 404 and a central computer 402. The central computer 402 includes a routing coordinator and a database of information from the vehicles 410a-410c in the fleet. Autonomous vehicle fleet routing refers to the routing of multiple vehicles in a fleet. In some implementations, autonomous vehicles communicate directly with each other.

When a ride request is received from a passenger, the routing coordinator selects an autonomous vehicle 410a-410c to fulfill the ride request, and generates a route for the autonomous vehicle 410a-410c. The generated route includes a route from the autonomous vehicle's present location to the pick-up location, and a route from the pick-up location to the final destination. Each of the autonomous vehicles 410a, 410b, 410c in the fleet are equipped to perform passenger safety monitoring according to the methods 200 and 300 of FIGS. 2 and 3. In particular, the vehicles 410a, 410b, 410c communicate with a central computer 402 via a cloud 404. When a passenger selects the "wait" option (step 204 of FIG. 2), the request is communicated to the passenger's vehicle via the cloud 404. Similarly, when a passenger selects the "come back" option (step 212 of FIG. 2), the request is communicated to the passenger's vehicle via the cloud 404. If the passenger selects the emergency button while the vehicle is waiting, this request is communicated to the cloud 404, and, in some examples, this request is communicated directly with the waiting vehicle. When the central computer 402 receives an emergency request from a passenger's device, it initiates contact with emergency services and sends the emergency services the vehicle's location.

In some implementations, after an autonomous vehicle, e.g., first autonomous vehicle 410a, drops off a passenger, the routing coordinator directs the first autonomous vehicle 410a to wait at the drop-off location for a selected period of time. In some examples, the first autonomous vehicle 410a waits until the passenger is out of sight (e.g., inside a building or other structure). In some examples, the first autonomous vehicle 410a waits fora predetermined amount of time, such as for one minute. In some examples, after an autonomous vehicle, e.g., first autonomous vehicle 410a, drops off a passenger, the routing coordinator directs the first autonomous vehicle 410a to leave, but then receives a "come back" request from the passenger and reroutes the first autonomous vehicle 410a back to the drop-off location. At the drop-off location, the autonomous vehicle may wait for a selected period of time, or the passenger may re-enter the vehicle and begin a new route. In some implementations, after an autonomous vehicle, e.g., first autonomous vehicle 410a, drops off a passenger, the routing coordinator directs the first autonomous vehicle 410a to leave, but then receives a "come back" request from the passenger, and the routing coordinator directs a different close-by autonomous vehicle 410b to drive to the drop-off location. In some examples, the routing coordinator selects a second autonomous vehicle 410b to fulfill the "come back" request when the routing coordinator determines that the second autonomous vehicle will arrive at the drop-off location sooner than the first autonomous vehicle. In some examples, the routing coordinator prioritizes the "come back" request over new ride requests.

In various implementations, if an emergency is detected after a passenger drop-off, for a selected period of time during and after the emergency the central computer 402 notifies other vehicles in the fleet of the emergency. The central computer 402 may instruct vehicles to avoid the area immediately surrounding the emergency. In some examples, the routing coordinator chooses routes for vehicles that avoid the area where the emergency occurred. When vehicles receive a notification of an emergency event, the vehicles may reroute. In some examples, when vehicles receive a notification of an emergency event, the vehicles inform current passengers of the emergency event. In some examples, when new route requests are received that travel close to the emergency event, the routing coordinator alerts the user requesting the ride of the emergency event.

Each vehicle 410a-410c in the fleet of vehicles communicates with a routing coordinator. Information gathered by various autonomous vehicles 410a-410c in the fleet can be saved and used to generate information for future routing determinations. For example, sensor data can be used to generate route determination parameters. In general, the information collected from the vehicles in the fleet can be used for route generation or to modify existing routes. In some examples, the routing coordinator collects and processes position data from multiple autonomous vehicles in real-time to avoid traffic and generate a fastest-time route for each autonomous vehicle. In some implementations, the routing coordinator uses collected position data to generate a best route for an autonomous vehicle in view of one or more travelling preferences and/or routing goals. In some examples, the routing coordinator uses collected position data corresponding to emergency events to generate a best route for an autonomous vehicle to avoid a potential emergency situation. In some examples, the routing coordinator uses collected position data corresponding to emergency events to predict a probability of a "wait" or "come back" request.

In some examples, a passenger is charged a small fee for a "wait" request. Similarly, in some examples, a passenger is charged a fee for a "come back" request. In some examples, one or both of the "wait" service and the "come back" service are provided free-of-charge as a safety precaution for passengers.

According to various implementations, a set of parameters can be established that determine which metrics are considered (and to what extent) in determining routes or route modifications. In some examples, the route includes likelihood of an emergency event. Likelihood of an emergency event may be determined based on past emergency event locations and the time of day past emergency events have occurred. Generally, a routing goal refers to, but is not limited to, one or more desired attributes of a routing plan indicated by at least one of an administrator of a routing server and a user of the autonomous vehicle. The desired attributes may relate to a desired duration of a route plan, a comfort level of the route plan, a vehicle type for a route plan, safety of the route plan, and the like. For example, a routing goal may include time of an individual trip for an individual autonomous vehicle to be minimized, subject to other constraints. As another example, a routing goal may be that comfort of an individual trip for an autonomous vehicle be enhanced or maximized, subject to other constraints. In another example, a routing goal includes a wait time at drop-off.

Routing goals may be specific or general in terms of both the vehicles they are applied to and over what timeframe they are applied. As an example of routing goal specificity in vehicles, a routing goal may apply only to a specific vehicle, or to all vehicles in a specific region, or to all vehicles of a specific type, etc. Routing goal timeframe may affect both when the goal is applied (e.g., some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

Some examples of routing goals include goals involving trip duration (either per trip, or average trip duration across some set of vehicles and/or times), physics, laws, and/or company policies (e.g., adjusting routes chosen by users that end in lakes or the middle of intersections, refusing to take routes on highways, etc.), distance, velocity (e.g., max., min., average), source/destination (e.g., it may be optimal for vehicles to start/end up in a certain place such as in a pre-approved parking space or charging station), intended arrival time (e.g., when a user wants to arrive at a destination), duty cycle (e.g., how often a car is on an active trip vs. idle), energy consumption (e.g., gasoline or electrical energy), maintenance cost (e.g., estimated wear and tear), money earned (e.g., for vehicles used for ridesharing), person-distance (e.g., the number of people moved multiplied by the distance moved), occupancy percentage, higher confidence of arrival time, user-defined routes or waypoints, fuel status (e.g., how charged a battery is, how much gas is in the tank), passenger satisfaction (e.g., meeting goals set by or set for a passenger) or comfort goals, environmental impact, passenger safety, pedestrian safety, toll cost, etc. In examples where vehicle demand is important, routing goals may include attempting to address or meet vehicle demand.

Routing goals may be combined in any manner to form composite routing goals; for example, a composite routing goal may attempt to optimize a performance metric that takes as input trip duration, rideshare revenue, and energy usage and also, optimize a comfort metric. The components or inputs of a composite routing goal may be weighted differently and based on one or more routing coordinator directives and/or passenger preferences.

Likewise, routing goals may be prioritized or weighted in any manner. For example, a set of routing goals may be prioritized in one environment, while another set may be prioritized in a second environment. As a second example, a set of routing goals may be prioritized until the set reaches threshold values, after which point a second set of routing goals take priority. Routing goals and routing goal priorities may be set by any suitable source (e.g., an autonomous vehicle routing platform, an autonomous vehicle passenger).

The routing coordinator uses maps to select an autonomous vehicle from the fleet to fulfill a ride request. In some implementations, the routing coordinator sends the selected autonomous vehicle the ride request details, including pick-up location and destination location, and an onboard computer on the selected autonomous vehicle generates a route and navigates to the destination. In some implementations, the routing coordinator in the central computing system 402 generates a route for each selected autonomous vehicle 410a-410c, and the routing coordinator determines a route for the autonomous vehicle 410a-410c to travel from the autonomous vehicle's current location to a first intermediate stop.

Example of a Safety Monitoring Interface

Figures 5A, 5B:
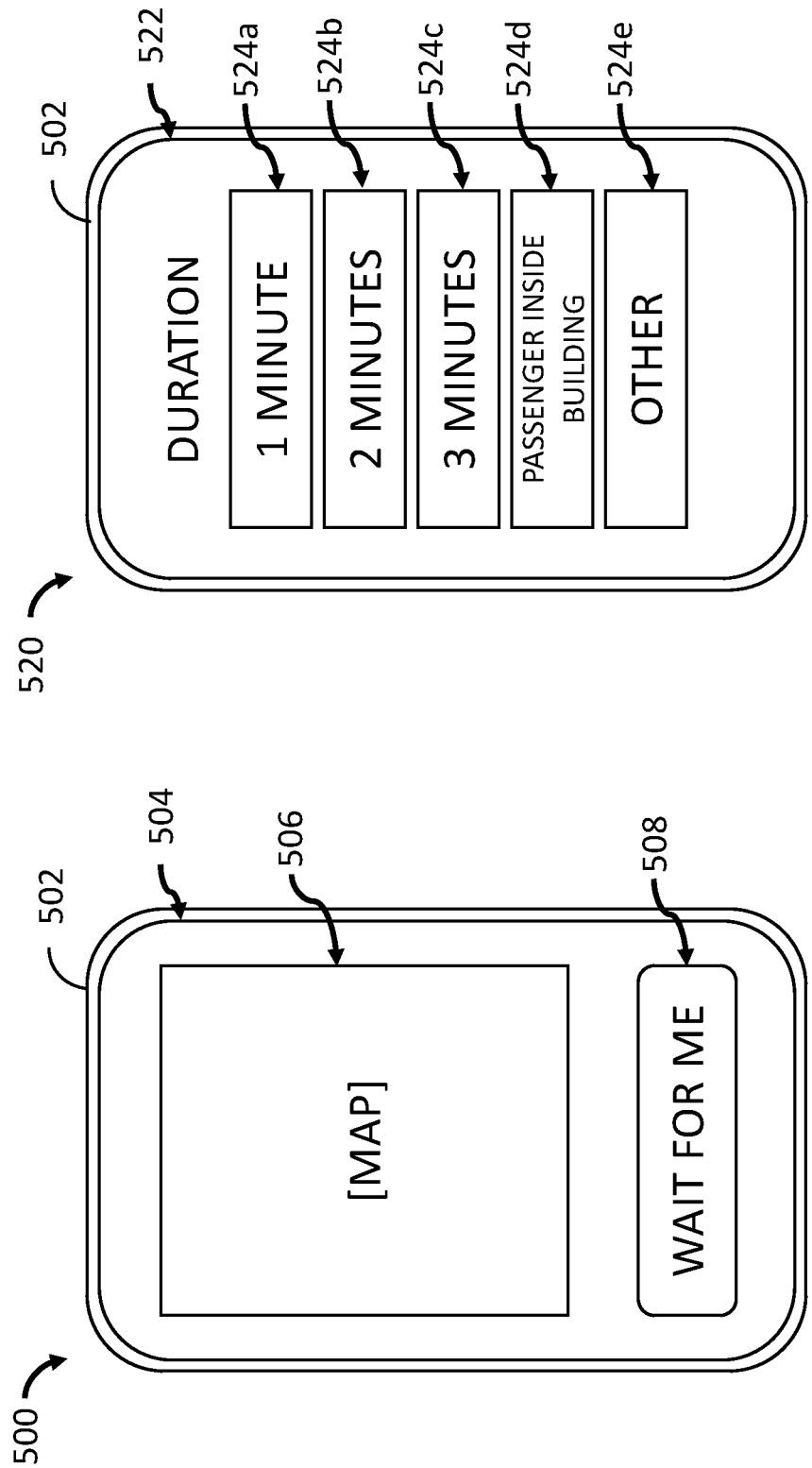
FIGS. 5A-5B show examples of an interface for requesting an autonomous vehicle passenger safety monitoring, according to some embodiments of the disclosure according to some embodiments of the disclosure.

FIGS. 5A-5B show examples 500, 520 of an interface for requesting autonomous vehicle passenger safety monitoring, according to some embodiments of the disclosure. FIG. 5A shows an example 500 of a device 502 showing an interface 504 having a map 506 and a "wait for me" button 508. In various examples, the map 506 shows a user's location and/or a selected destination location. In some examples, the map shows a route between the user's location and a destination location. In various implementations, the map shows one or more safety/risk categories for locations on the map at the given time of day, for example, based on past fleet data. For example, various colors may be overlayed on the map to indicate predicted risk category. In some implementations, the map does not show predicted risk information.

The interface 504 includes an "wait for me" button 508 for the user/passenger to request that the autonomous vehicle wait at the drop off location after the passenger exits the vehicle. Selecting the "wait for me" button 508 allows the user to select the duration of time the vehicle will wait after the passenger exits the vehicle. After selecting the "wait for me" button 508, the user is prompted to select a wait duration. FIG. 5B shows an example 520 of the device 502 showing an interface 522 having duration selections. In the example shown in FIG. 5B, the user can select a stop duration of "1 minute" 524*a*, "2 minutes" 524*b*, "3 minutes" 524*c*, until the "passenger inside building" 524*d*, or "other" 524*e*. In some examples, if the user selects "other" 524*e*, the user is then prompted to set the wait duration. In other examples, if the user selects "other" 524*e*, the user is prompted to enter a wait duration. In some examples, the user is charged a fee for the wait time. In some examples, a short wait time is provided free of charge, and then a user is charged a fee for wait times over a certain limit, with the fee increasing with the amount of time to wait.

FIGS. 6A-6C show examples 600, 640 of an interface for requesting an autonomous vehicle emergency assistance, according to some embodiments of the disclosure. After a passenger has selected the "wait for me" option and exited the vehicle, the interface 604 displays an "emergency" button 608. If the passenger encounters an emergency or otherwise wants to contact emergency services, the passenger selects the "emergency" button 608. According to some implementations, selection of the "emergency" button 608 initiates the method 300 shown in FIG. 3. When the "emergency" button 608 is selected, the phone 502 displays a cancellation interface 622 having a "cancel" button 628. The "cancel" button 628 allows the passenger to cancel the emergency request after selecting the "emergency" button 608 (e.g., if the passenger accidentally selected the "emergency" button 608).

FIG. 6C shows an interface 642 having a "come back" button 648. According to various implementations, if the passenger did not select the "wait for me" 508 in FIG. 5A, the vehicle drives away after drop-off. After the passenger exits the vehicle, the interface displays a "come back" button, allowing the passenger to request the autonomous vehicle return to the drop-off location, as described above with respect to FIG. 3.

Example of a Computing System for Ride Requests

Figure 7:
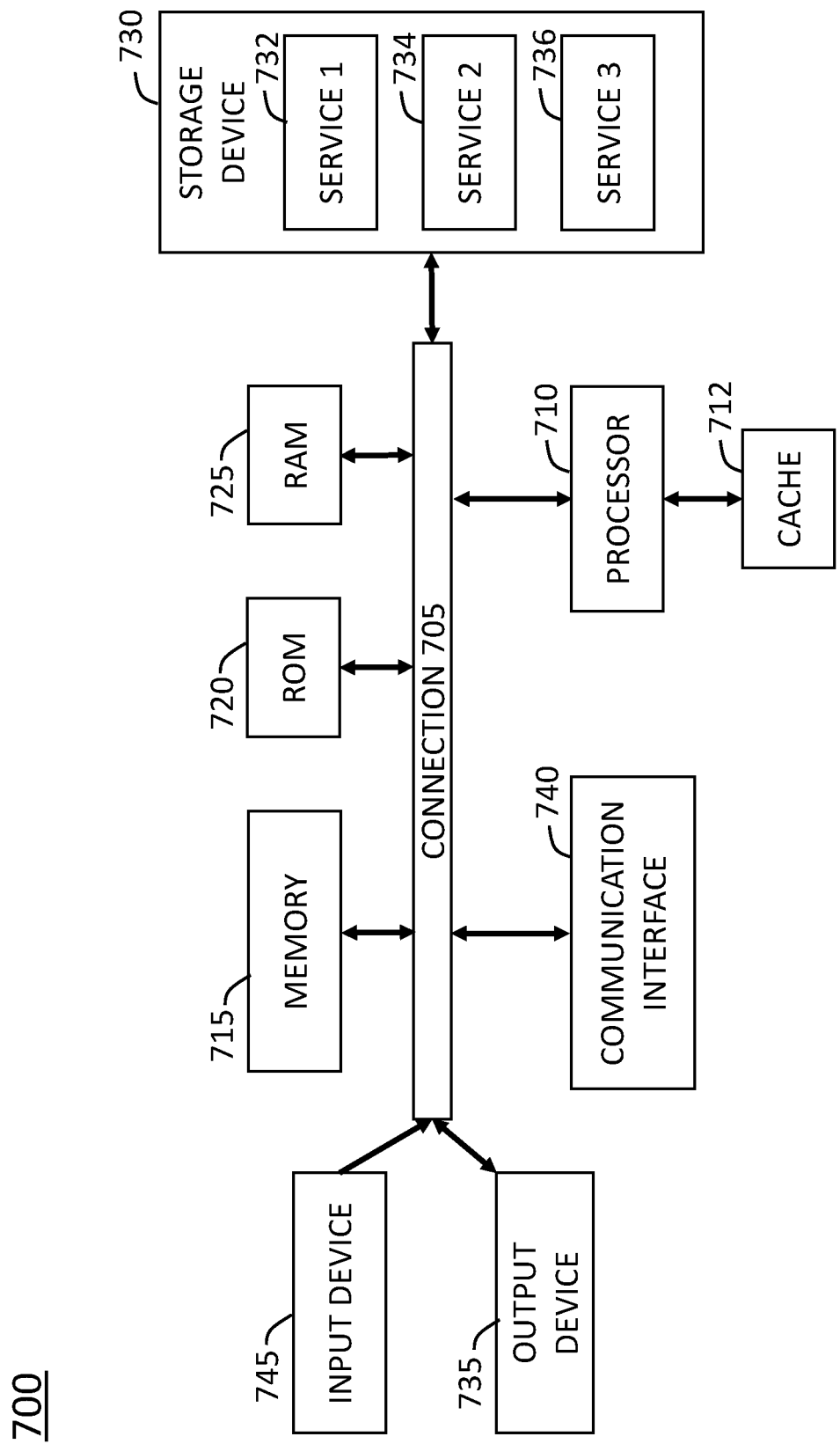
FIG. 7 shows an example embodiment of a system for implementing certain aspects of the present technology.

FIG. 7 shows an example embodiment of a computing system 700 for implementing certain aspects of the present technology. In various examples, the computing system 700 can be any computing device making up the onboard computer 104, the central computing system 402, or any other computing system described herein. The computing system 700 can include any component of a computing system described herein which the components of the system are in communication with each other using connection 705. The connection 705 can be a physical connection via a bus, or a direct connection into processor 710, such as in a chipset architecture. The connection 705 can also be a virtual connection, networked connection, or logical connection.

In some implementations, the computing system 700 is a distributed system in which the functions described in this disclosure can be distributed within a datacenter, multiple data centers, a peer network, etc. In some embodiments, one or more of the described system components represents many such components each performing some or all of the functions for which the component is described. In some embodiments, the components can be physical or virtual devices.

The example system 700 includes at least one processing unit (CPU or processor) 710 and a connection 705 that couples various system components including system memory 715, such as read-only memory (ROM) 720 and random access memory (RAM) 725 to processor 710. The computing system 700 can include a cache of high-speed memory 712 connected directly with, in close proximity to, or integrated as part of the processor 710.

The processor 710 can include any general-purpose processor and a hardware service or software service, such as services 732, 734, and 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction, the computing system 700 includes an input device 745, which can represent any number of input mechanisms, such as a microphone for speech, a touch-sensitive screen for gesture or graphical input, keyboard, mouse, motion input, speech, etc. The computing system 700 can also include an output device 735, which can be one or more of a number of output mechanisms known to those of skill in the art. In some instances, multimodal systems can enable a user to provide multiple types of input/output to communicate with the computing system 700. The computing system 700 can include a communications interface 740, which can generally govern and manage the user input and system output. There is no restriction on operating on any particular hardware arrangement, and therefore the basic features here may easily be substituted for improved hardware or firmware arrangements as they are developed.

A storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as a processor 710, a connection 705, an output device 735, etc., to carry out the function.

As discussed above, each vehicle in a fleet of vehicles communicates with a routing coordinator. When a vehicle is flagged for service, the routing coordinator schedules the vehicle for service and routes the vehicle to the service center. When the vehicle is flagged for maintenance, a level of importance or immediacy of the service can be included. As such, service with a low level of immediacy will be scheduled at a convenient time for the vehicle and for the fleet of vehicles to minimize vehicle downtime and to minimize the number of vehicles removed from service at any given time. In some examples, the service is performed as part of a regularly-scheduled service. Service with a high level of immediacy may require removing vehicles from service despite an active need for the vehicles.

Routing goals may be specific or general in terms of both the vehicles they are applied to and over what timeframe they are applied. As an example of routing goal specificity in vehicles, a routing goal may apply only to a specific vehicle, or to all vehicles of a specific type, etc. Routing goal timeframe may affect both when the goal is applied (e.g., urgency of the goal, or, some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

In various implementations, the routing coordinator is a remote server or a distributed computing system connected to the autonomous vehicles via an internet connection. In some implementations, the routing coordinator is any suitable computing system. In some examples, the routing coordinator is a collection of autonomous vehicle computers working as a distributed system.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Select Examples

Example 1 provides a method for passenger safety monitoring in an autonomous vehicle, comprising dropping off a passenger at a destination location; waiting at the destination location for a selected period of time; monitoring the passenger during the selected period of time; and monitoring vehicle surroundings during the selected period of time.

Example 2 provides a method according to one or more of the preceding and/or following examples, including detecting a passenger emergency; and activating an emergency response.

Example 3 provides a method according to one or more of the preceding and/or following examples, wherein detecting a passenger emergency includes receiving an emergency notification.

Example 4 provides a method according to one or more of the preceding and/or following examples, including further comprising receiving a cancellation of the emergency notification.

Example 5 provides a method according to one or more of the preceding and/or following examples, wherein detecting a passenger emergency includes at least one of detecting a loud noise, detecting a passenger fall, and detecting an assault on the passenger.

Example 6 provides a method according to one or more of the preceding and/or following examples, wherein activating an emergency response includes at least one of flashing vehicle lights and sounding a vehicle alarm.

Example 7 provides a method according to one or more of the preceding and/or following examples, wherein activating an emergency response includes contacting emergency services Example 8 provides a method according to one or more of the preceding and/or following examples, further comprising one of: receiving a wait request, and receiving a return request.

Example 9 provides a method according to one or more of the preceding and/or following examples, further comprising, when a return request is received, returning to the destination location.

Example 10 provides a method according to one or more of the preceding and/or following examples, further comprising allowing the passenger to return to the vehicle during the selected period of time.

Example 11 provides an autonomous vehicle configured for passenger safety monitoring, comprising: an onboard computing system configured to stop the autonomous vehicle at a destination location, receive a wait request including a selected wait period, and keep the vehicle near the destination location during the selected wait period; and a plurality of sensors configured to monitor a passenger during the selected wait period.

Example 12 provides an autonomous vehicle according to one or more of the preceding and/or following examples, wherein the selected wait period begins when the passenger exits the vehicle.

Example 13 provides an autonomous vehicle according to one or more of the preceding and/or following examples, wherein the onboard computing system is configured to receive sensor data from the plurality of sensors and, based on the sensor data, detect a passenger emergency.

Example 14 provides an autonomous vehicle according to one or more of the preceding and/or following examples, further comprising an alarm system, and wherein the onboard computing system is further configured to activate an emergency response including sounding the alarm system and flashing vehicle lights.

Example 15 provides an autonomous vehicle according to one or more of the preceding and/or following examples, wherein the onboard computing system is further configured to activate an emergency response including contacting emergency services.

Example 16 provides a system for passenger safety monitoring in an autonomous vehicle, comprising: a central computing system including a routing coordinator configured to: receive a wait request including a destination location, determining identification of the autonomous vehicle associated with the wait request, and adding a selected wait time to the autonomous vehicle route; and an onboard computing system on the first autonomous vehicle configured to: receive the wait request, drop off the passenger at the destination location, and wait at the destination location for the selected wait time.

Example 17 provides a system according to one or more of the preceding and/or following examples, wherein the onboard computing system is further configured to detect a passenger emergency and activate an emergency response.

Example 18 provides a system according to one or more of the preceding and/or following examples, wherein the onboard computer is configured to receive an emergency notification.

Example 19 provides a system according to one or more of the preceding and/or following examples, wherein the onboard computer is configured to flash vehicle lights and sound a vehicle alarm.

Example 20 provides a system according to one or more of the preceding and/or following examples, wherein the onboard computer is configured to contact emergency services.

Example 21 provides a method, autonomous vehicle, and/or system according to one or more of the preceding and/or following examples, wherein the passenger is a delivery service user, and wherein the autonomous vehicle waits while the user drops off a package in the autonomous vehicle.

Example 22 provides a method, autonomous vehicle, and/or system according to one or more of the preceding and/or following examples, wherein the passenger is a delivery service user, and wherein the autonomous vehicle waits while a user picks up a package in the autonomous vehicle.

Variations and Implementations

According to various examples, driving behavior includes any information relating to how an autonomous vehicle drives. For example, driving behavior includes how and when the autonomous vehicle actuates its brakes and its accelerator, and how it steers. In particular, the autonomous vehicle is given a set of instructions (e.g., a route or plan), and the driving behavior determines how the set of instructions is implemented to drive the car to and from various destinations, and, potentially, to stop for passengers or items. Driving behavior may include a description of a controlled operation and movement of an autonomous vehicle and the manner in which the autonomous vehicle applies traffic rules during one or more driving sessions. Driving behavior may additionally or alternatively include any information about how an autonomous vehicle calculates routes (e.g., prioritizing fastest time vs. shortest distance), other autonomous vehicle actuation behavior (e.g., actuation of lights, windshield wipers, traction control settings, etc.) and/or how an autonomous vehicle responds to environmental stimulus (e.g., how an autonomous vehicle behaves if it is raining, or if an animal jumps in front of the vehicle). Some examples of elements that may contribute to driving behavior include acceleration constraints, deceleration constraints, speed constraints, steering constraints, suspension settings, routing preferences (e.g., scenic routes, faster routes, no highways), lighting preferences, "legal ambiguity" conduct (e.g., in a solid-green left turn situation, whether a vehicle pulls out into the intersection or waits at the intersection line), action profiles (e.g., how a vehicle turns, changes lanes, or performs a driving maneuver), and action frequency constraints (e.g., how often a vehicle changes lanes). Additionally, driving behavior includes information relating to whether the autonomous vehicle drives and/or parks.

As will be appreciated by one skilled in the art, aspects of the present disclosure, in particular aspects of a perception system for an autonomous vehicle, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The preceding disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the description and the claims. Note that all optional features of the apparatus described above may also be implemented with respect to the method or process described herein and specifics in the examples may be used anywhere in one or more embodiments.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A method for passenger safety monitoring outside an autonomous vehicle, comprising:
dropping off a passenger at a destination location;
transmitting a return option for presentation on a passenger rideshare interface, wherein the return option causes the autonomous vehicle to return to the destination location after dropping off the passenger;
waiting at the destination location for a selected period of time;
monitoring the passenger during the selected period of time;
monitoring vehicle surroundings during the selected period of time;
allowing the passenger to re-enter the vehicle;
detecting a passenger emergency outside the autonomous vehicle;
activating an emergency response;
determining the passenger has re-entered the vehicle; and
receiving a passcode confirming passenger identity after the passenger has re-entered the vehicle, wherein the passcode is received from one of the passenger rideshare interface and an in-vehicle tablet.

2. The method of claim 1, wherein detecting a passenger emergency includes receiving an emergency notification from the passenger rideshare interface.

3. The method of claim 2, further comprising receiving a cancellation of the emergency notification from the passenger rideshare interface.

4. The method of claim 1, wherein detecting a passenger emergency outside the autonomous vehicle includes at least one of detecting a loud noise outside the autonomous vehicle, detecting a passenger fall outside the autonomous vehicle, and detecting an assault on the passenger outside the autonomous vehicle.

5. The method of claim 1, wherein activating an emergency response includes at least one of flashing vehicle lights, sounding a vehicle alarm, and contacting emergency services.

6. The method of claim 1, further comprising one of receiving a wait request and receiving a return request.

7. The method of claim 1, further comprising receiving a return request from the passenger rideshare interface and returning to the destination location.

8. The method of claim 1, further comprising:
detecting a change in the number of passengers after allowing the passenger to re-enter the vehicle; and
determining that an additional passenger has entered the vehicle.

9. An autonomous vehicle configured for passenger safety monitoring outside the autonomous vehicle, comprising:
an onboard computing system configured to stop the autonomous vehicle at a destination location, receive a wait request including a selected wait period, and keep the vehicle near the destination location during the selected wait period; and
a plurality of sensors configured to monitor a passenger outside the vehicle during the selected wait period,
wherein the onboard computing system is configured to:
transmit a return option for presentation on a passenger rideshare interface after the selected wait time, wherein the return option causes the autonomous vehicle to return to the destination location after dropping off the passenger,
receive sensor data from the plurality of sensors based on the sensor data, detect a passenger emergency outside the vehicle,
allow a passenger to re-enter the vehicle,
determine that the passenger has re-entered the vehicle, and
receive a passcode confirming passenger identity after the passenger has re-entered the vehicle, wherein the passcode is received from one of the passenger rideshare interface and an in-vehicle tablet.

10. The autonomous vehicle of claim 9, wherein the onboard computing system is to detect a passenger exit from the vehicle, and wherein the selected wait period begins at the passenger exit.

11. The autonomous vehicle of claim 9, further comprising an alarm system including an exterior alarm, and wherein the onboard computing system is further configured to activate and emergency response including sounding the exterior alarm and flashing exterior vehicle lights.

12. The autonomous vehicle of claim 9, wherein the onboard computing system is further configured to activate an emergency response including contacting emergency services.

13. The autonomous vehicle of claim 9, wherein the onboard computing system is configured to detect a passenger emergency outside the vehicle by at least one of:
detecting a loud noise outside the autonomous vehicle,
detecting a passenger fall outside the autonomous vehicle, and
detecting an assault on the passenger outside the autonomous vehicle.

14. The autonomous vehicle of claim 9, wherein the onboard computing system is further configured to:
detect a change in the number of passengers after allowing the passenger to re-enter the vehicle; and
determine that an additional passenger has entered the vehicle.

15. The autonomous vehicle of claim 10, wherein the onboard computing system is configured to determine that a passenger is not visible and wherein the selected wait period ends a selected time period after the determination that the passenger is not visible.

16. A system for passenger safety monitoring outside an autonomous vehicle, comprising:
a central computing system including a routing coordinator configured to:
receive a wait request including a destination location,
determine an identification of the autonomous vehicle associated with the wait request,
add a selected wait time to the autonomous vehicle route, and
transmit a return option for presentation on a passenger rideshare interface after the selected wait time, wherein the return option causes the autonomous vehicle to return to the destination location after dropping off a passenger; and
an onboard computing system on the autonomous vehicle configured to:
receive the wait request,
drop off the passenger at the destination location,
wait at the destination location for the selected wait time, and
monitor vehicle surroundings during the selected wait time;

receive sensor data from a plurality of autonomous vehicle sensors, and based on the sensor data, detect a passenger emergency outside the vehicle during the wait time;

allow the passenger to re-enter the vehicle;

determine the passenger has re-entered the vehicle; and receive a passcode confirming passenger identity after the passenger has re-entered the vehicle, wherein the passcode is received from one of the passenger rideshare interface and an in-vehicle tablet.

17. The system of claim 16, wherein the onboard computing system is further configured to activate an emergency response.

18. The system of claim 16, wherein the passcode is a special code that indicates an emergency notification and wherein the onboard computing system is further configured to activate an emergency response based on the special code.

19. The system of claim 17, wherein the onboard computer is configured to flash external vehicle lights, sound a vehicle alarm, and contact emergency services.

20. The system of claim 17, wherein the central computing system is further configured to:

receive the selected return option from the passenger rideshare interface, and transmit a return instruction to the onboard computing system, and wherein the onboard computing system is further configured to:

cause the autonomous vehicle to drive back to the destination location, and, after allowing the passenger to re-enter the vehicle, drive towards an emergency services location.

\* \* \* \* \*